United States Patent [19]

Amoroso et al.

[11] Patent Number: 5,016,261
[45] Date of Patent: May 14, 1991

[54] METHOD AND APPARATUS FOR ACHIEVING IMPROVED ANTI-JAM PERFORMANCE VIA CONVERSION GAIN

[75] Inventors: Frank Amoroso; Jacob L. Bricker, both of Santa Ana, Calif.

[73] Assignee: Hughes Aircraft Company, Los Angeles, Calif.

[21] Appl. No.: 339,552

[22] Filed: Apr. 17, 1989

[51] Int. Cl.$^5$ .............................................. H04B 1/10
[52] U.S. Cl. ........................................ 375/76; 375/83; 375/96; 375/103
[58] Field of Search ................. 342/12, 16, 17; 375/1, 375/57, 83, 94, 96, 99, 103, 76; 329/304, 310; 370/91, 93, 95.3; 328/115, 116, 117; 364/724.11, 819

[56] References Cited

U.S. PATENT DOCUMENTS 3,432,619  3/1969  Blasbalg .................................. 370/93
4,587,662  5/1986  Langewellpott ....................... 375/96
4,833,694  5/1989  Young et al. .......................... 375/96

Primary Examiner—Benedict V. Safourek
Attorney, Agent, or Firm—Wanda K. Denson-Low

[57] ABSTRACT

Method and apparatus are disclosed for improving the anti-jam performance of a processing circuit to increase conversion gain and reduce small signal suppression resulting from processing a phase modulated input signal accompanied by jamming interference. Input signals are each segregated into signal chips by a matched filter 23, and by an adaptive threshold circuit 13 in accordance with a predetermined relative threshold. The threshold is set to repeatedly distinguish a predetermined number of signal chips having greater signal amplitude. The absolute amplitude threshold level may, therefore, vary in accordance with the particular signal chips forming each input signal segment. A phase quantizer 29 operates to extract phase information from the signal chips. A phase correlator 15 operates to apply a first weighting gain factor to signal chips equal to or exceeding the threshold, and a second weighting gain factor to the remaining chips, the first weighting gain factor being greater than the second weighting gain factor.

20 Claims, 10 Drawing Sheets a) $r < \rho - 1$ b) $1 - \rho < r < 1 + \rho$ c) $r > 1 + \rho$

5,016,261

METHOD AND APPARATUS FOR ACHIEVING IMPROVED ANTI-JAM PERFORMANCE VIA CONVERSION GAIN

FIELD OF THE INVENTION

The present invention relates generally to radio communications systems and more particularly to the optimized rejection of electronic carrier wave (CW) interference in phase modulated, phase noncoherent radio signals including direct sequence pseudonoise signals such as those used in the Joint Tactical Distribution System (JTIDS) signals.

BACKGROUND OF THE INVENTION

Time Division Multiple Access (TDMA) radio communication systems provide integrated communication, navigation, identification and position location means for military operations.

Tactical radio communications in an electronic warfare (EW) environment must be made as immune as possible from all EW measures such as high power brute force jammers, spoof jammers, electronic signal interceptors, and direction finders. Simply increasing friendly transmitter power is expensive as well as ineffective against spoof jammers, interceptors, and direction finders. In Time Division Multiple Access (TDMA) the systems such as JTIDS, the functions of communications relaying, navigation/position location, and identification require that each user maintain alertness to all other user transmissions. This requirement rules out the use of highly directional antennas to provide anti-jam protection. Consequently, jam resistant, intercept-resistant phase modulated, phase noncoherent spread spectrum Direct Sequence Pseudonoise (DSPN) communication links such as Joint Tactical Information Distribution System (JTIDS) have been developed for TDMA communications.

JTIDS is a notable example of a communications system which utilizes a phase modulated, phase noncoherent radio signal with antijam capabilities. JTIDS is an integrated communications, navigation, and identification TDMA military communications system designed to operate in a 960-1215 MHz TACAN band and in a CW tactical environment spanning a geographic area of up to 500 miles. The time division JTIDS architecture allows multiple users to participate in the communications network. The various terminals of the JTIDS network may comprise, for example, mission aircraft subscribers, sea based subscribers and ground subscribers. All terminals in the network can listen to all time divisions or time slots in which they are not transmitting. Code division mulitiplexing is used to provide multiple communication networks which have overlapping coverage patterns. A terminal can switch between multiple networks on a time slot by time slot basis. Each 7.8125 millisecond time slot contains a 3354-microsecond transmission burst comprising 129 symbols, each symbol having a duration of 26 microseconds. Symbols consist of either one or two 32-chip pulses, each of a duration of 6.4 microseconds.

In the EW environment, the possibility of multi-tone CW jamming based on frequency modulating techniques poses a threat to TDMA communications not heretofore adequately addressed by current signal processing procedures. The TDMA signal is currently processed by an MSK chip matched filter followed by an IAGC, such as the MITRE IAGC, which may be viewed as a hard limiter followed by a three bit phase quantizer. The phase quantizer is followed by a signal correlator, which in the JTIDS processor comprises a 32 chip pulse correlator. At the signal receiver input, the DSPN information signal plus CW and Gaussian interference signal enter the chip matched filter at a jammer power to signal power ratio of J/S. The chip matched filter serves to maximize the ratio of signal power to the Gaussian component of interference. At the hard limiting step, the MITRE IAGC provides the signal processing with a property called constant false alarm rate (CFAR) wherein any sudden high power burst of spurious jamming or noise entering the system will be clipped to a preset amplitude level and thereby prevented from propagating further into the chain of signal processors. Furthermore, the probability of declaring a noise symbol to be a signal symbol remains constant, independent of the magnitude of that high power burst of jamming. Hard limiting, however, also introduces what is known as a small signal suppression effect which degrades the signal to noise ratio of the signal entering the correlator. Additionally, in the case of the JTIDS signal, the noise equivalent bandwidth of the chip matched filter is a fraction $\pi^2/16$, of the chip rate or 0.62 times the chip rate, which is equivalent to $-2.1$ dB. Consequently, J/S increases by 2.1 dB as the input signal together with a band-centered CW jammer pass through the matched filter. As the matched filtered input signal passes through the hard limiter, the effects of small signal suppression in the hard limiter result in a further increase in J/S of about 4.3 dB (greater than 4.3 dB if J/S at the hard limiter input is greater than 2.1 dB). Since the J/S conversion loss in the order of 4.3 dB represents a 2.7 to 1 loss in relation to transmitter power, it constitutes a substantial deficiency in JTIDS and other phase modulated, phase noncoherent signal processing systems not heretofore adequately addressed in the prior art.

SUMMARY OF THE INVENTION

Method and apparatus are disclosed for improving the anti-jam performance of a processing circuit to increase conversion gain and reduce small signal suppression resulting from processing a phase modulated input signal accompanied by jamming interference. Input segments are each segregated into signal chips, sorted by magnitude and separated in accordance with a predetermined threshold. The threshold is repeatedly reset to distinguish a predetermined number of signals chips having greater magnitudes. The threshold level may, therefore, vary in accordance with the particular signal chips forming each input segment. A first weighting gain factor is applied to signal chips whose magnitudes equal or exceed the threshold, and a second weighting gain factor is applied to the remaining chips, the first weighting gain factor being greater than the second weighting gain factor.

In the presently preferred embodiment a flash converter is used to sort signal chips, in accordance with amplitude, and to determine which of the signal chips have greater magnitude. In the preferred embodiment the received signals are each segregated into 32 signal chips.

In the preferred embodiment the first threshold and weighting gain factor are set to optimize conversion gain in the presence of CW interference, without sacrificing conversion gain in the presence of Gaussian interference. Determination of the optimum threshold level and weighting gain factor may be determined experimentally or by mathematical modeling. Experimental determination proceeds by first assuming a characteristic signal-to-noise ratio for the received signal, selecting a preliminary amplitude threshold for evaluation and varying the preliminary amplitude threshold and weighting gain factor to determine the characteristic gain of the circuit in the presence of continuous CW interference. A threshold amplitude level and weighting gain factor may then be identified that provide optimum performance with respect to CW interference. The performance of the circuit, utilizing the identified threshold level and weighting gain factor, may then be evaluated with respect to Gaussian interference, and the results compared with the performance of a hard limiter in the presence of the same Gaussian interference. The identified amplitude threshold level may then be adjusted to ensure that the performance of the circuit under Gaussian noise conditions is at least as favorable as the performance of a hard limiter under such conditions. Though performance of the circuit in the presence of CW interference may thus be slightly reduced, the performance remains superior to contemporary systems.

In relation to the presently preferred embodiment the optimum gain factor was determined to be 8, the optimum amplitude threshold level, with respect to CW interference alone, was determined to be approximately 60%, and the optimum compromise amplitude threshold level with respect to both CW interference and Gaussian interference, was determined to be approximately 70%. Thus, the circuit preferably operates to repeatedly sort the received signal chips in order of amplitude and to apply a gain factor of 8 to those chips appearing in the top 70 percentile by amplitude. The remaining chips are not so amplified, i.e. a gain factor of 1 is applied.

The circuit has been found effective with respect to both constant power CW interference and pulsed CW interference, as described more fully below.

DETAILED DESCRIPTION OF THE PRESENTLY PREFERRED EMBODIMENT

The detailed description as set forth below is intended merely as a description of the presently preferred embodiment of the invention, and is not intended to represent the only form in which the present invention may be constructed or utilized. The description below sets forth the functions as a sequence of signals that are affected by the invention in connection with the illustrated embodiment. It is to be understood, however, that the same, or equivalent functions or signal sequences may be accomplished by different embodiments that are also intended to be encompassed within the spirit and scope of the invention.

Figure 1A:
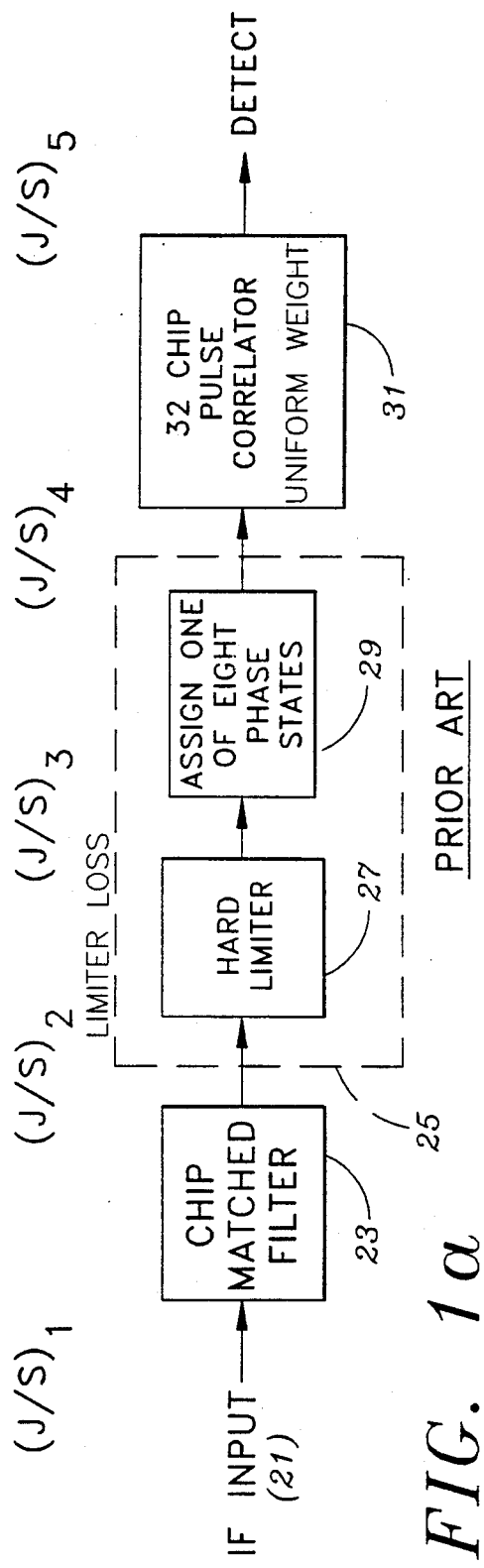
FIG. 1a is a block diagram illustrating the sequence of signal processing steps in a contemporary JTIDS system.

FIG. 1a illustrates the sequence of signal processing steps for a contemporary JTIDS system. The information plus interference signals enter the chip matched filter at the IF input 21. At that location the ratio of jammer power to signal power is identified as $(J/S)_1$. The matched filter 23 is assumed to be normalized to unit energy impulse response, and the jammer frequency, as before, is assumed to be centered on the IF frequency.

Contemporary IAGC 25 action may be viewed as a combination of a hard limiter 27 followed by a 3-bit phase quantizer 29 that assigns one of 8 phase states. The output of the IAGC 25 is communicated to a 32 chip pulse correlator 31. The output of the pulse correlator 31 is then communicated to additional processing circuitry (not shown) which accumulates and interprets the signal from the correlator.

Figure 1B:
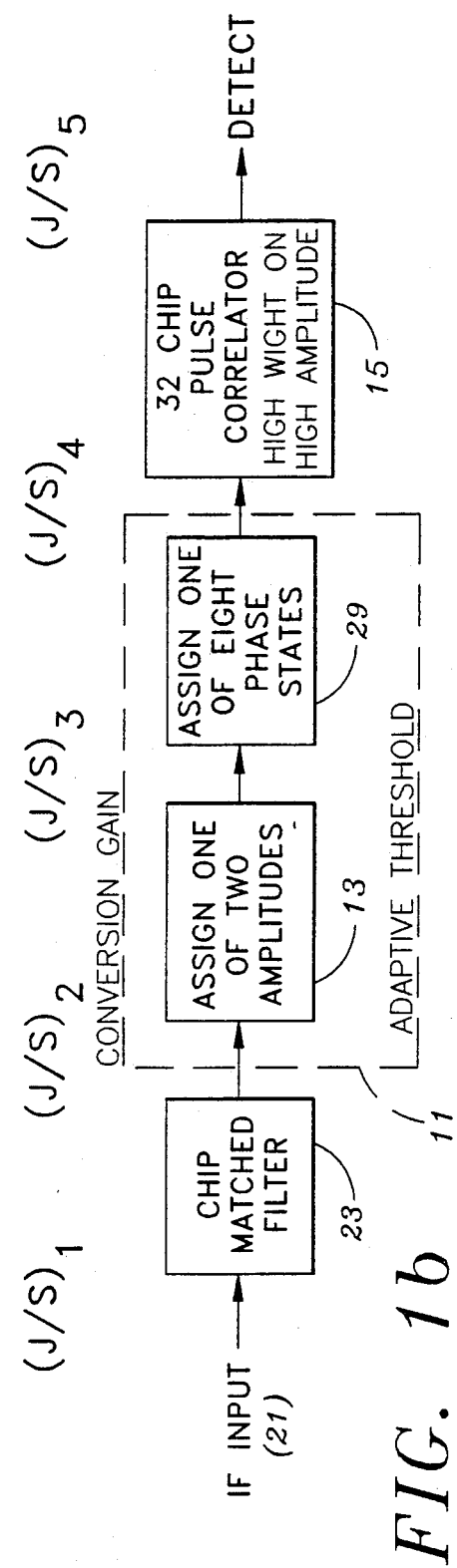
FIG. 1b is a block diagram illustrating a sequence of signal processing steps in accordance with the present invention.

In the broadest sense, the present invention is distinguishable from such contemporary systems by the use of an adaptive A/D multilevel quantizer, as illustrated in FIG. 1b. The function of the adaptive A/D converter 11 is to assign an amplitude value, either HIGH or LOW to each chip. That amplitude value, determined by adaptive threshold circuit 13, along with signal chip phase information extracted by phase correlator 29, is communicated to the 32 chip pulse correlator 15 in such a manner as to increase the weight given to the phase information extracted from chips having high magnitude. The A/D converter 11 is constructed to be able to accumulate and sort a plurality of chips, e.g. 32 chips received during an output signal segment. The chips are sorted in accordance with their magnitude, and a threshold is set in order to distinguish chips having a lower magnitude from chips having a higher magnitude. As described more fully below the higher magnitude chips are more likely to be characterized by a higher ratio of information signal-to-interference signal. Thus, the circuit operates to emphasize the chips likely to have a greater information signal content, i.e. more reliable phase angle information. Further signal processing (not shown) operates to aggregate the information from the circuit to extract the necessary information. By emphasizing chips that generally convey correct phase information the function of such additional signal processing is rendered more reliable.

The precise manner in which the threshold level for the A/D converter is set is described more fully below. In general, the threshold level and weighting factor are optimized to produce the highest conversion gain, assuming a CW interference signal and a characteristic signal to noise ratio of the input signal. The performance of such a circuit, optimized for CW interference, is then evaluated for Gaussian noise conditions. The optimum threshold level may then be adjusted such that the performance of the circuit in Gaussian noise conditions at least equals the performance of a hard limiter (without the adaptive A/D converter) under similar Gaussian noise conditions. A determination of the optimum amplitude threshold and weighting factor may be effected for both continuous CW interference and pulsed CW interference.

Figure 2:
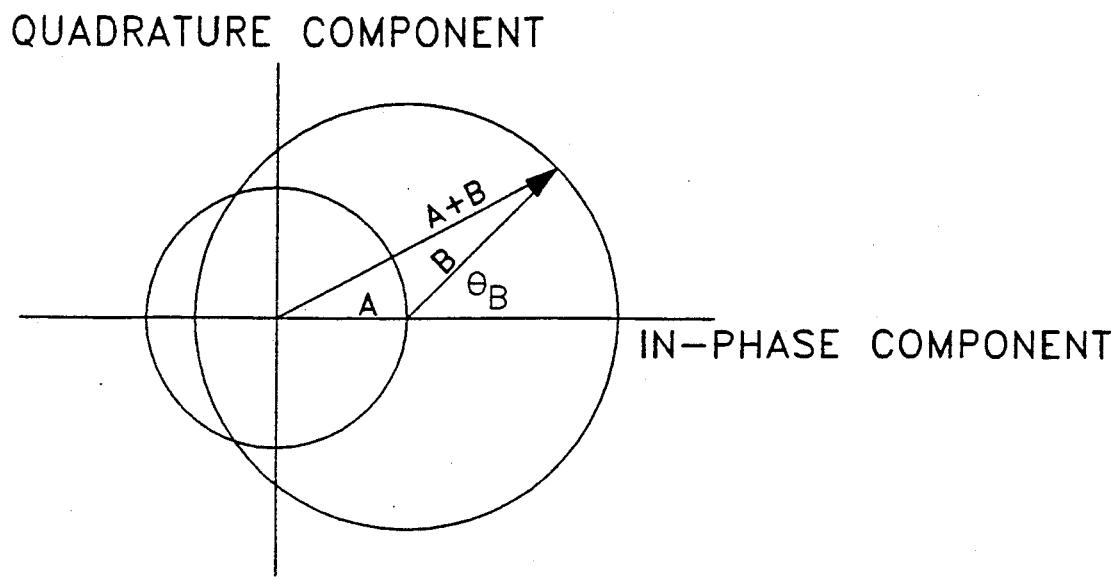
FIG. 2 illustrates the operation of a contemporary hard limiter within a JTIDS signal format, in polar coordinates.
Figure 3:
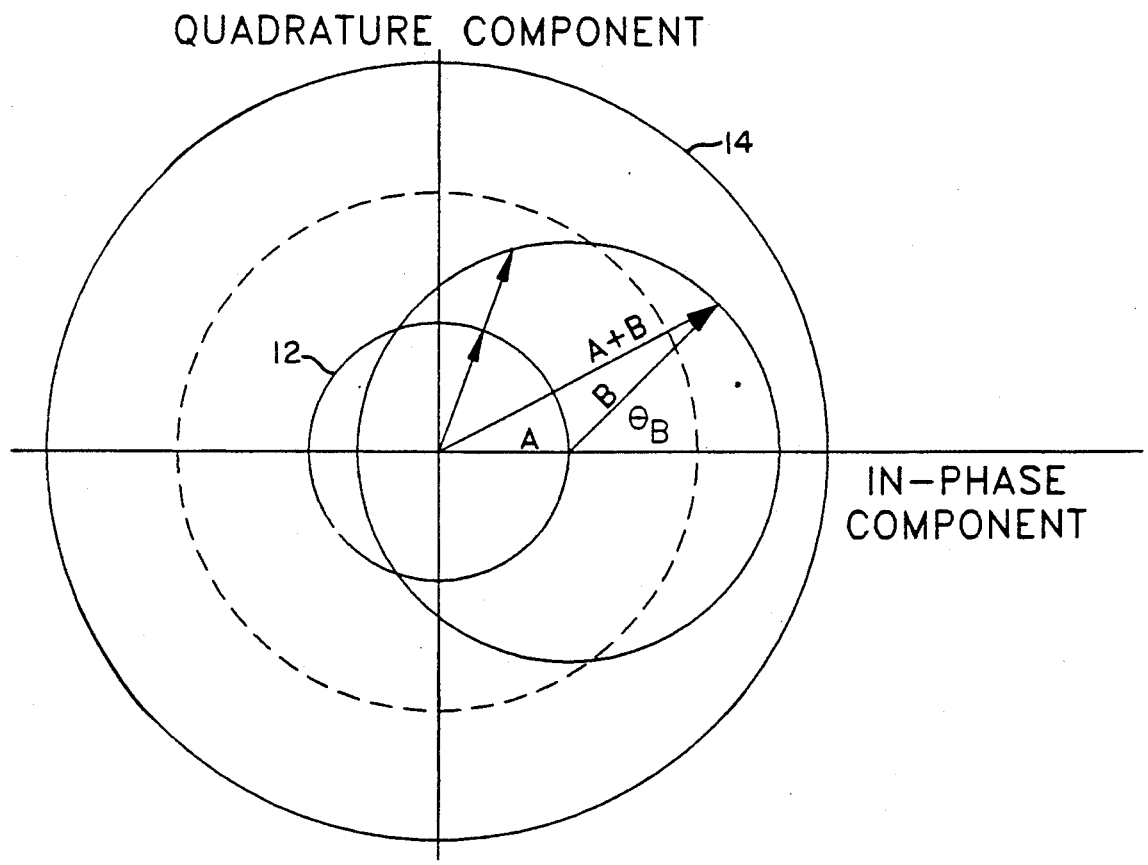
FIG. 3 illustrates the operation of the present invention in the same format as FIG. 2.

FIG. 2 illustrates how a hard limiter operates within the JTIDS signal format, in polar coordinates. FIG. 3 illustrates how the A/D converter of the present invention operates in the same format. Without loss of generality the signal chip A is assigned unit magnitude and zero phase. Because JTIDS detection is noncoherent the signal processing will take no account of the static difference between the phase of the received carrier and that of the locally supplied carrier. Instead, the phase angles of all chips will be measured relative to each other. Added to the typical signal chip is an interference vector $\vec{B}$, with phase $\theta_B$ relative to $\vec{A}$. In the present step of analysis the vector $\vec{B}$ will have a constant magnitude to represent constant CW interference. In general, the phase of $\vec{B}$ will vary with respect to the signal vector. If the interfer's frequency differs from the signal frequency by some fixed value $\Delta f$ the $\theta_B$ will increase at the rate $2\pi\Delta f$ radians/second. If the interfer's frequency varies then the pattern of relative phase will be more complex. In the present analysis the relative phase $\theta_B$ will be assumed random from chip to chip with uniform distribution from 0 to 2.

The vector $\vec{A}+\vec{B}$ represents signal plus interference. The first processor to be evaluated, a hard limiter, will preserve the phase of $\vec{A}+\vec{B}$ but change its magnitude to unity, so that the tip of $\vec{A}+\vec{B}$ is moved to the unit circle centered on the origin. A solid circle centered on the tip of $\vec{A}$ shows the locus of the tip of $\vec{A}+\vec{B}$. All points on the circle are equiprobable when $\theta_B$ is uniformly distributed, as currently assumed.

The second processor to be evaluated, the adaptive A/D converter (FIG. 3) sets a magnitude threshold at its input (which sees $\vec{A}+\vec{B}$). The threshold appears in FIG. 3 as a dashed circle. Whenever the tip of $\vec{A}+\vec{B}$ falls inside that dashed circle the A/D converter outputs a low magnitude vector of magnitude indicated by FIG. 12 with the same phase as $\vec{A}+\vec{B}$. Such an output would coincide with that of the hard limiter of FIG. 1a. Whenever the tip of A+B falls outside that dashed circle the A/D converter outputs a high magnitude vector of magnitude indicated by circle 14 with the same phase as $\vec{A}+\vec{B}$. The high magnitude vector always has a length R, a parameter of the analysis, which may be thought of as a weighting factor for favorable chips, i.e., those for which the magnitude of $\vec{A}+\vec{B}$ is sufficiently high and, in the case of constant CW jamming, the phase of $\vec{A}+\vec{B}$ is sufficiently "near" to that of the signal chip $\vec{A}$.

The chip voltage at the processor output (either hard limiter or A/D converter) is called $\vec{C}$, and may be represented as a complex quantity for mathematical convenience. The chip signal is defined as the expectation of $\vec{C}$ over all values of $\theta_B$. That expected value if called C. The signal power S is referred to as $|\overline{C}|^2$. Now the jam-to-signal power ratio at various stages of the processing signal is designated as:

(J/S)$_1$ at the chip matched filter input;
(J/S)$_2$ at the input to the hard limiter or adaptive A/D converter, whichever is in use;
(J/S)$_3$ at the output of the hard limiter or adaptive A/D converter output, whichever is in use.

The quantity J represents jammer power level. At the input to the limiter or adaptive A/D converter the jammer is pure CW whose power level $J_2$ is defined and measured. At the output of the processor the jammer power level, $J_3$, is defined as:

$$J_3 = E\{|\vec{C}-\overline{C}|\}^2$$

where E {} denotes probabilistic expectation over the variable $\theta_B$.

The conversion gain is then defined as:

$$CG = (J/S)_2/(J/S)_3$$

The definitions of (J/S)$_3$ and $G_c$ apply equally well to all types of interference, including Gaussian noise and combinations of Gaussian noise and CW interference. The definition of $S_3$ as $\vec{C}$ is consistent with the classical interpretation of PN correlation.

For a correlation over 32 chips the expected value of the correlator input is $32\overline{C}$, hence the signal power is $|32\overline{C}|^2$. The variance of the correlate or output, which represents interference power, with a random chip stream, is $32J_3$. Thus the PN processing gain is the expected factor of 32, i.e., $$\frac{J_3}{|\overline{C}|^2} \div \frac{32}{|32\overline{C}|^2} = 32J_3$$

which represents a reduction in the jammer to signal power ratio.

Figure 4:
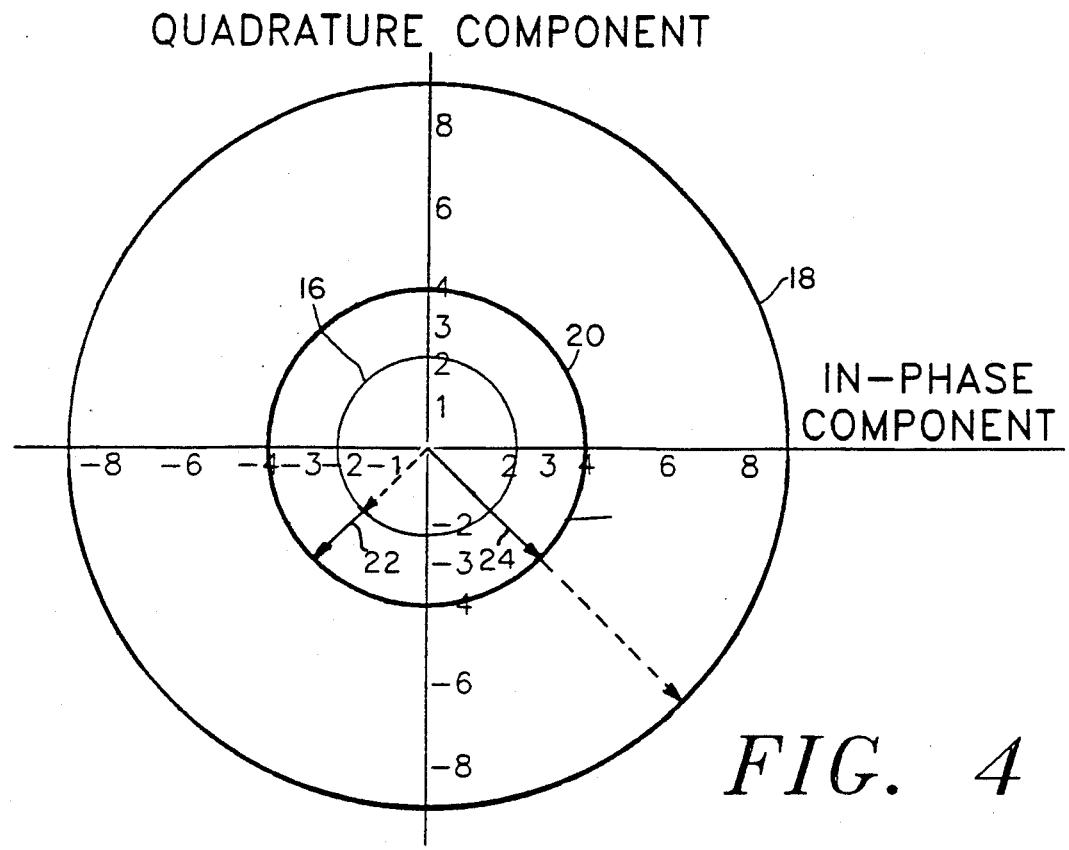
FIG. 4 further illustrates the operation of the present invention including the use of a weighting gain factor.
Figure 5:
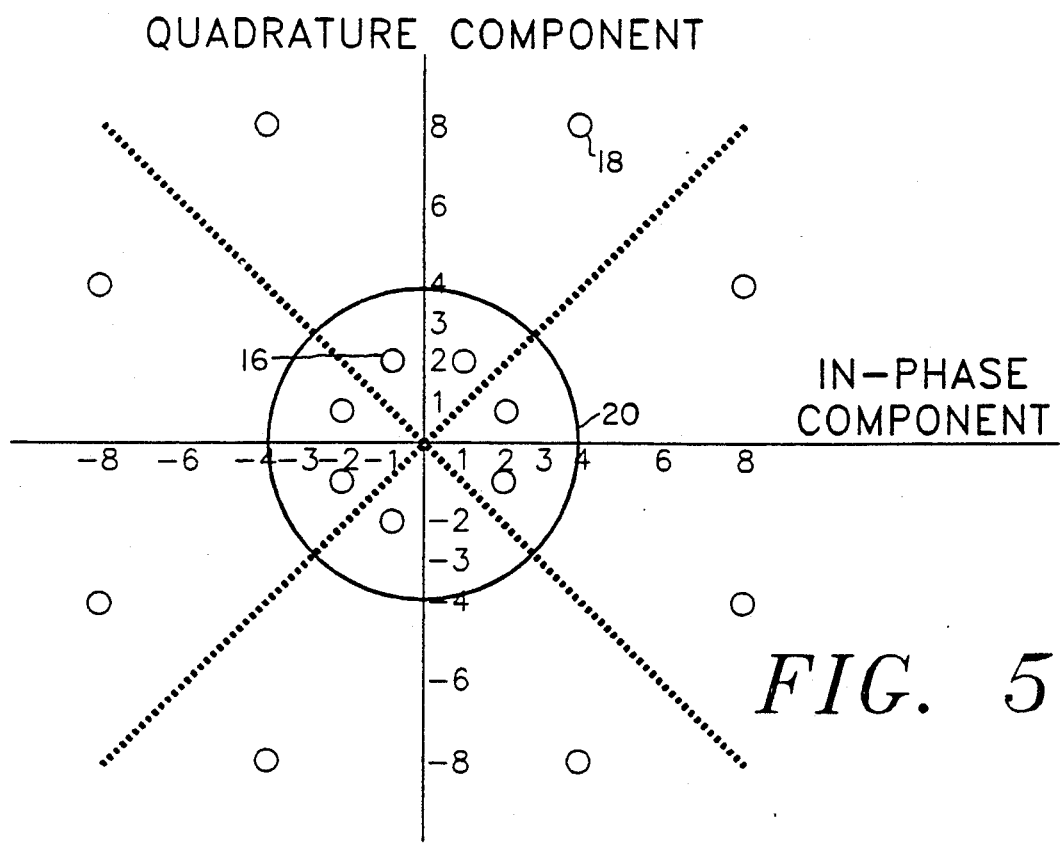
FIG. 5 illustrates the effective distribution of points representing signal chips after the application of a weighting gain factor and phase quantization as in the contemporary MITRE IAGC.

FIG. 4 illustrates the processing of a typical chip after CW jamming has been added. Circle 16 indicates the low amplitude output, circle 18 indicates the high amplitude output, and circle 20 indicates the amplitude threshold. Solid and dashed arrow 22 indicates a chip below threshold 20 having a low amplitude output. Solid and dashed arrow 24 indicates a chip exceeding the amplitude the threshold 20 and consequently having a high amplitude output. The figure assumes a case where the circuit operates to emphasize chips exceeding the amplitude threshold by a factor of 4, i.e. R=4. Thus, signal chips that exceed the amplitude threshold are processed by the A/D converter and the pulse correlator in a manner such that they are viewed as having even greater significance (e.g. enhanced by a factor of R=4). FIG. 5 illustrates the effective distribution of points representing the signal chips after a weighting factor and phase quantization have been applied.

It should be understood that segregation of the chips, i.e. signal segments, by use of an amplitude threshold is useful to identify chips that are generally conveying correct phase information from chips that are conveying very likely wrong phase information. The magnitude of the chip is greater where the phase of the interference portion and the phase of the information are identical. In such a case, the magnitude of the interference portion reinforces the information portion. Similarly, the magnitude of the chip is set to a minimum where the phase of the information portion and the interference portion are opposite. By setting an amplitude threshold the chips least likely to contain valid phase information may be excluded or their phase information minimized in significance. The present invention operates to adaptively set such thresholds based upon sorting the 32 chips of each pulse, or segment, according to magnitude, and then identifying, e.g., the 22 or 23 highest chips of a 32 chip pulse. Consequently, the threshold level is not fixed and may vary from pulse to pulse. In such a manner, the present invention permits reliable identification of only the highest magnitude chips, e.g. the highest 22 or 23 chips, regardless of the implied magnitude of the amplitude threshold corresponding to that differentiation.

The optimum threshold criterion (22 or 23 highest) was determined by assuming a particular signal to noise ratio of the IF input signal and determining the threshold level and weighting factor R that produced the highest conversion gain obtainable by the circuit in the presence of CW interference. The performance of the circuit utilizing such a threshold level and gain factor is then compared to the performance of hard limiter in the presence of Gaussian noise. The threshold level may be adjusted, maintaining the weighting factor at its previously determined level, such that the performance of the circuit in Gaussian noise conditions is at least as favorable as the hard limiter circuit. Preferably, modification of the threshold level is minimal so as not to significantly detract from the performance of the circuit in the presence of CW interference.

The discussion below details the manner in which the optimum threshold level and weighting gain factor are selected to ensure favorable performance in the presence of CW interference (continuous or pulsed) and Gaussian interference.

Figure 6:
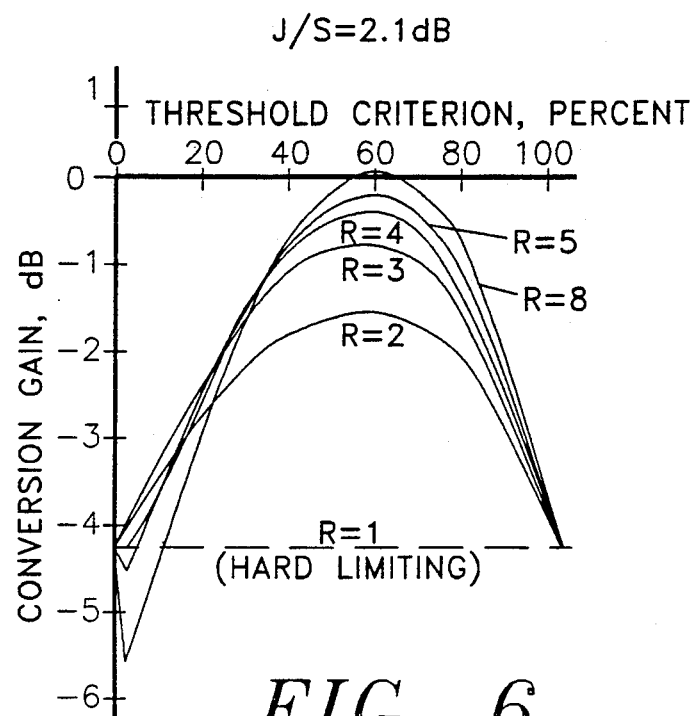
FIG. 6 illustrates the family of conversion gain curves for varying weighting gain factors for continuous CW interference.
Figure 7:
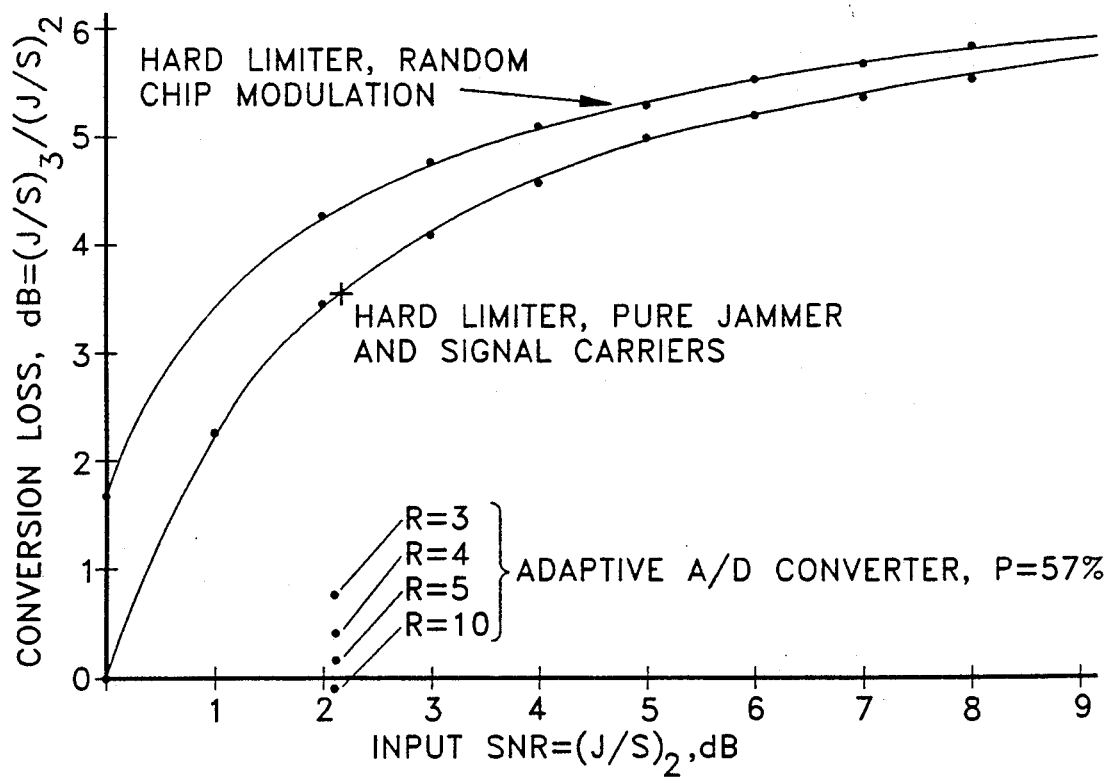
FIG. 7 compares hard limiter behavior under different circumstances to the adaptive converter of the present invention with different weighting gain factors, again in continuous CW interference.

FIG. 6 shows the family of conversion gain (CG) characteristics for pure CW jamming and $(J/S)_2 = 2.1$ dB, for $R = 1$, which is the case of hard limiting, $R = 2$, 3, 4, 5 and 8. Here the threshold criterion is expressed in percent of chips that exceed the magnitude threshold (e.g. $22/32 = 68.75\%$, $23/32 = 71.87\%$). Although the performance at the optimum value of the threshold criterion increases monotonically as R increases, $R = 8$ was set as a design choice due to its ease of digital implementation. The figure illustrates a cusping behavior of CG as the threshold criterion, in percent, approaches zero. For $R = 8$ the optimum value of the threshold criterion was found to be 57%. For a hard limiter, as $(J/S)_2 \rightarrow \infty$, $CG \rightarrow -6$ dB. FIG. 7 compares hard limiter behavior with random chip modulation (top curve) versus hard limiter behavior with pure jammer and signal carriers (lower curve). FIG. 7 also illustrates behavior of an adaptive converter as R varies. A steady improvement in CW performance of the adaptive converter is shown in FIG. 7 as R varies between $R = 3, 4,$ 5, 10, when the percentage criterion is set at its optimum value of 57%.

Figure 8:
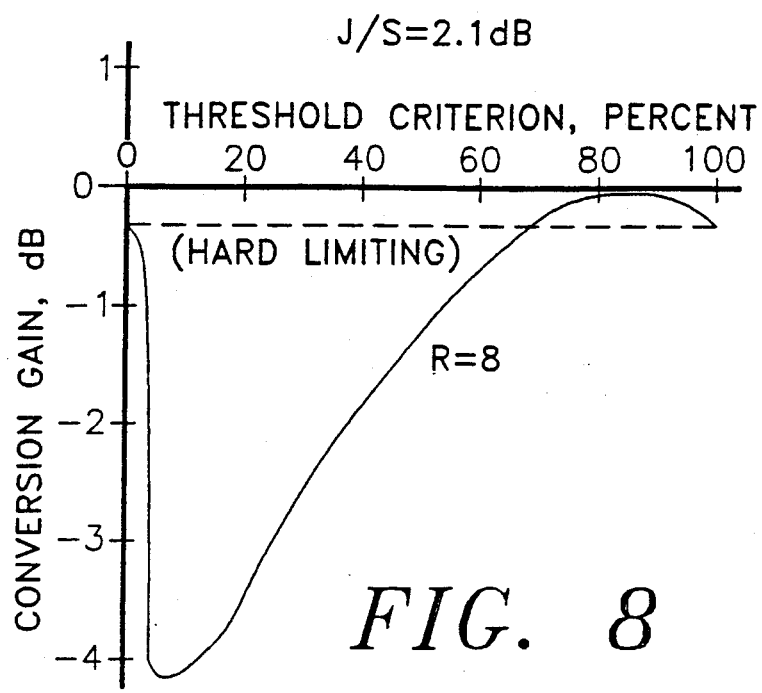
FIG. 8 illustrates the conversion gain of the present invention, at a set weighting gain factor, in the presence of Gaussian interference.

FIG. 8 gives the conversion gain versus threshold criterion for $R = 8$ with Gaussian interference for $(J/S)_2 = 2.1$ dB. The conversion loss of 0.325 dB at the 100% threshold criterion corresponds to hard limiting, for all chips are assigned high magnitude, and the output magnitude of the converter assumes the constant value of 8. At the 60% threshold criterion, the conversion loss is greater than at 100%, so that a choice of 60% will not maintain the performance of a hard limiter in Gaussian noise. However, a choice of 70% will bring about the slight improvement in performance over hard limiting.

Reference to FIG. 6 shows that a choice of 70% leads to a sacrifice of about 0.25 dB in performance in pure CW interference, so that 70% becomes the candidate for final recommendation along with the choice of $R = 8$.

Table 1 presents a comparison between analytic and simulation runs for 6 selected points on the performance curve of FIG. 8. The asterisks in Table 1 indicate that the corresponding simulations were not considered necessary to examine, since convergence to the exact results at lower values of trial numbers were in evidence. At threshold percentages close to 0 and 100 the events of the threshold crossings become rarer and therefore a large number of trial runs are required before convergence to the exact values becomes apparent.

TABLE 1

CONVERSION GAIN: ANALYSIS VS. SIMULATION (GAUSSIAN INTERFERENCE)

| | | | SIMULATION RUNS | | |
|---|---|---|---|---|---|
| Point | Threshold % | Analysis | 5000 | 10000 | 100000 |
| 1 | 0.00 | −.325 | −.201 | −.242 | −.318 |
| 2 | 2.50 | −3.358 | −3.114 | −3.248 | −3.342 |
| 3 | 6.77 | −4.148 | −4.128 | −4.090 | * |
| 4 | 22.00 | −3.150 | −3.02 | −3.151 | * |
| 5 | 84.60 | −.049 | −.029 | −.041 | −.040 |
| 6 | 99.99997 | −.325 | −.241 | −.243 | −.318 |

In evaluating the performance in pulsed jamming, an average power limited jammer was assumed so that, as the jammer reduces its duty factor, its peak power increases by the reciprocal of that duty factor. The conversion gain to be defined for pulse jamming was an average over all the chips of a jammed symbol. The pulsed jammer may choose to attack only a fraction of the 32 chips in a JTIDS pulse and in the example to follow, 13 chips were used to illustrate the results since that represented a worst case scenario.

Figure 9:
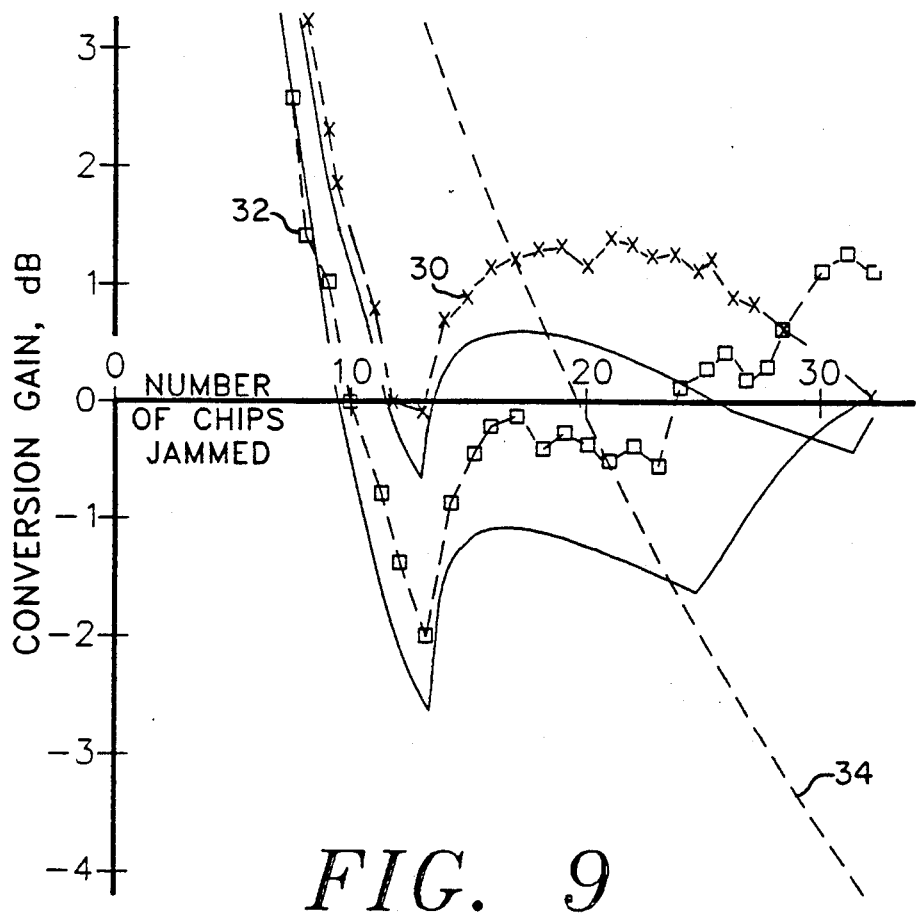
FIG. 9 illustrates conversion gain of the present invention in a pulsed jamming environment as a function of the number of chips jammed.

In normal signal processing the quantizer output is correlated over the entire 32 chips of the symbol. The adaptive quantizer output S/N ratio is defined as 1/32 of the S/N ratio of the correlator output. FIG. 9 shows the conversion gain of the bilevel quantizer with perfect phase preservation, versus the number of chips jammed, with the average $(J/S)_2 = 2.1$ dB and $R = 8$. The cases of 60 and 70 percent slice criteria are both illustrated in the diagram. The crosses 30 indicate the simulation of the 70% threshold and the squares 32 indicate the simulation of the 60% threshold. Dashed line 34 indicates hard limiting. The solid lines represent the result of an approximate model. The dots indicate the results of a simulation involving 10,000 Monte Carlo trials per point, which was utilized to examine the accuracy of the model.

When the number of jammed chips, K, is less than 11, there is good agreement between the approximate model and simulated results for both cases. However for the 70% criterion there is a maximal discrepancy of 1 dB between the simulation and the model when K is between 22 and 29 chips and as K approaches 32 the results are much closer. For the 60% criterion there is a maximal spread of 1.8 dB between the approximate and simulation values. In both cases the simulated results tend to follow the model curve in shape so that both exhibit cusp conditions at K=13 chips which represents the worst case jammer condition. Here there is about a 0.5 dB difference between the simulated versus the model results. In all cases the approximate model results are more pessimistic than those obtained by the simulation. Since the sampling error is quite small when 10,000 Monte Carlo trials are used, the simulation results are favored over the approximate model.

Figure 10:
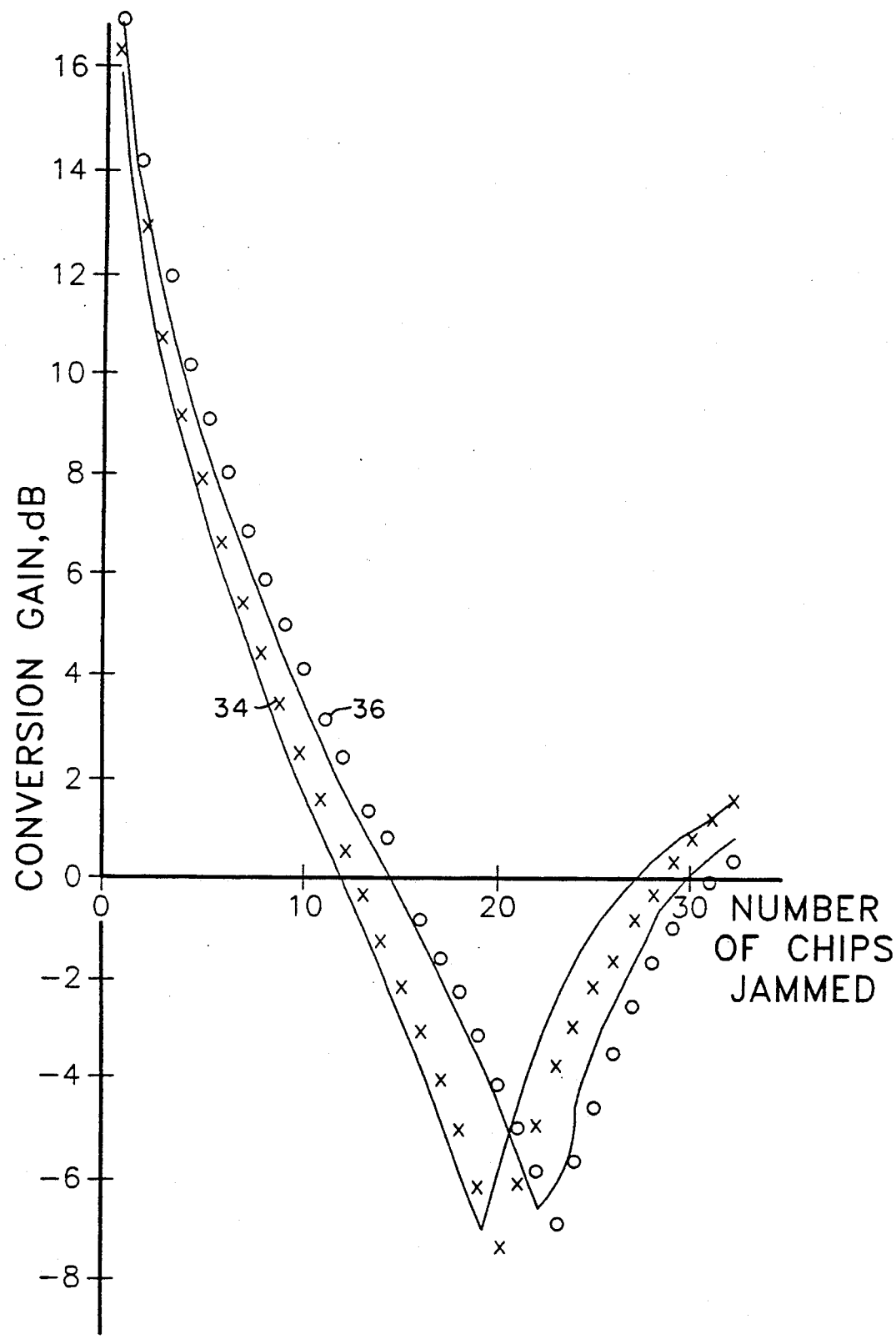
FIG. 10 repeats the analysis of FIG. 9 for a different signal-to-noise ratio.
Figure 11:
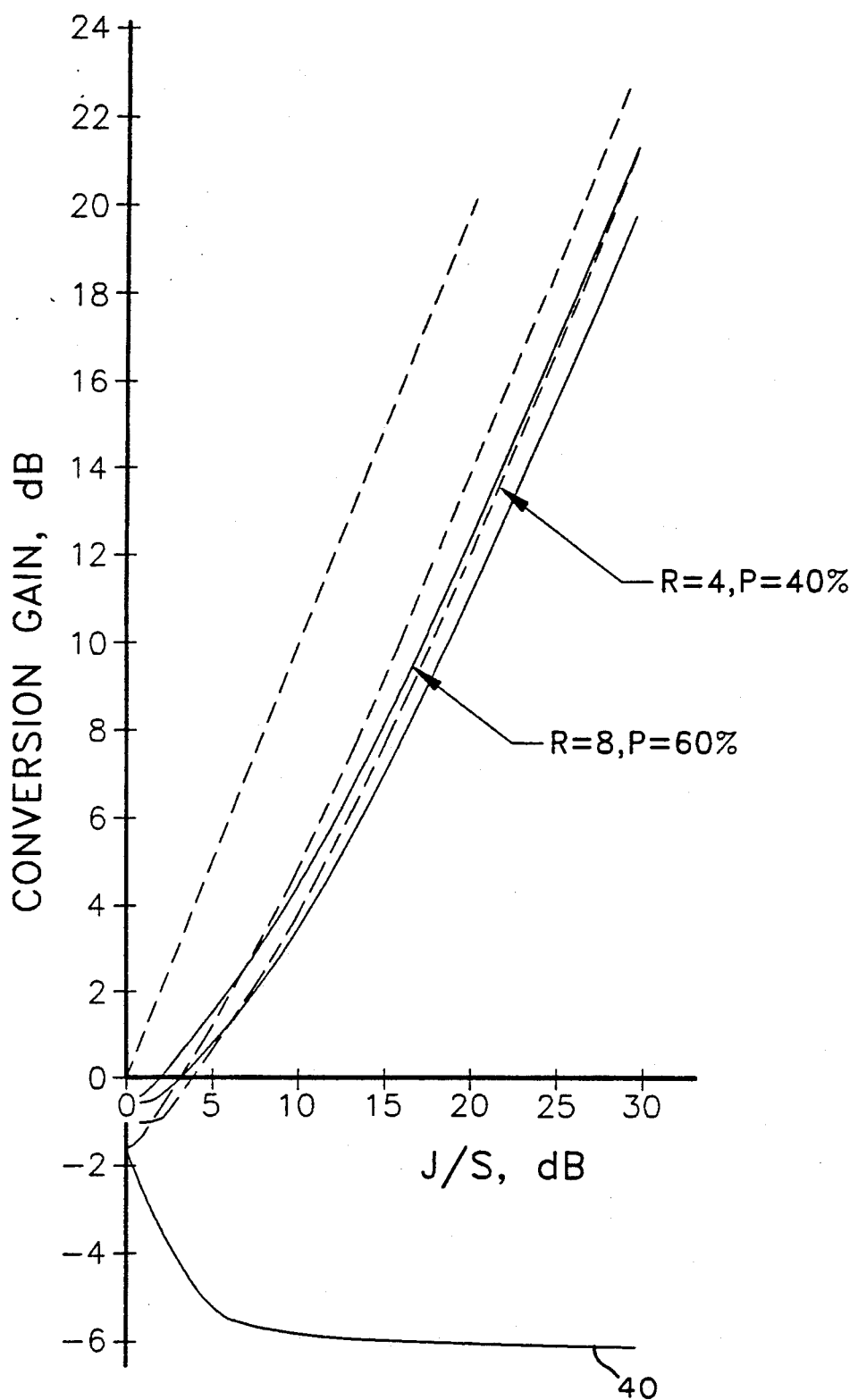
FIG. 11 illustrates the conversion gain for continuous CW jamming at different signal-to-noise ratios.

For a 60% threshold criterion the jammer's best performance when K=13 will force a conversion loss between 1.9 to 2.4 dB. But for a 70% criterion the worst conversion loss is only 0.05 to 0.6 dB. At higher values of $(J/S)_2$ the quantizer performance can be quite different from that indicated above. FIGS. 10 and 11 illustrate these differences. In FIG. 10 the conversion gain for continuous CW jamming is examined when $(J/S)_2=5$ dB. Here, a 60% criterion yields a maximum jammer loss of 7 dB at K=19 chips jammed and, for a 70% criterion, the corresponding maximal loss occurs at K=22 chips jammed with a 6.4 dB loss. In comparison the hard limiting loss is only 5.2 dB.

In FIG. 11, the conversion gain for continuous CW jamming is plotted for higher values of $(J/S)_2$. A threshold criterion of 40% leads to better performance at higher values of $(J/S)_2$ than either the 60% or 70% criteria, when R=8. Curve 40 indicates hard limiting.

Figure 12:
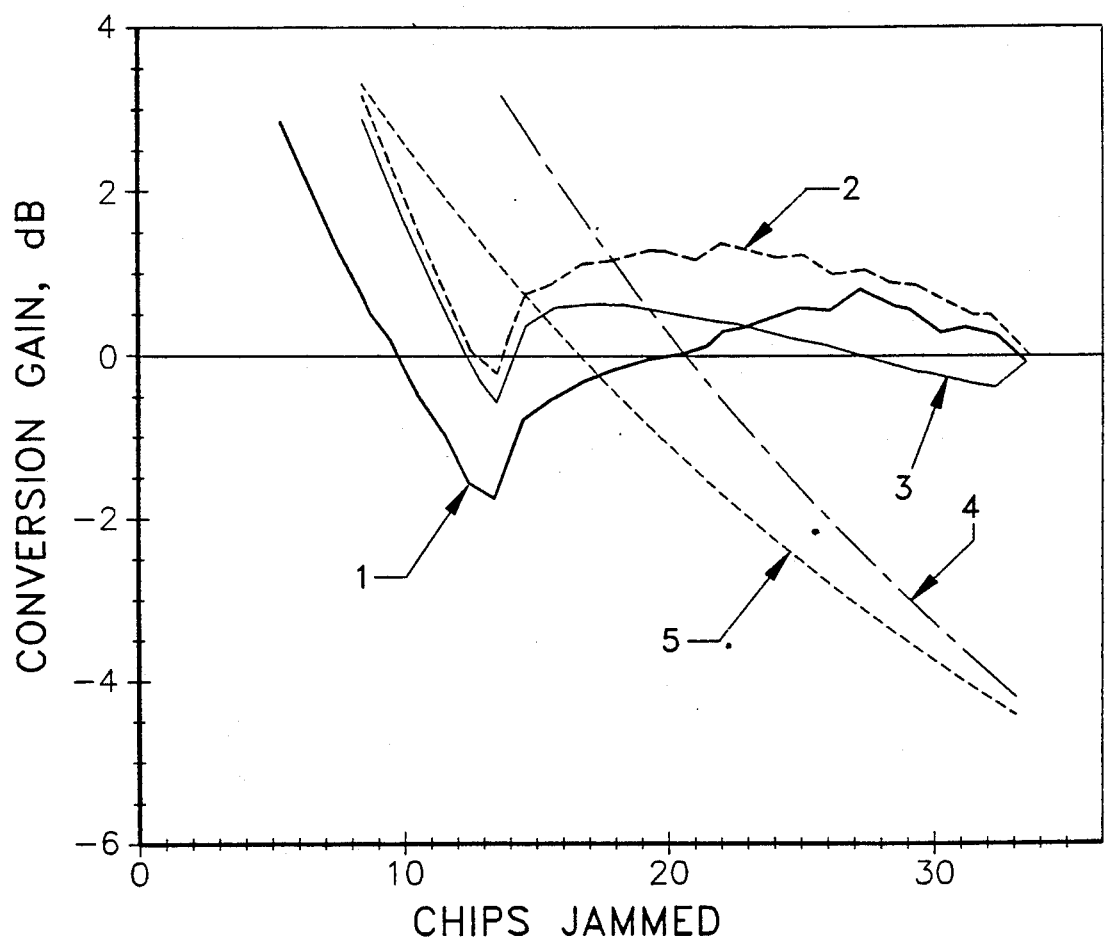
FIG. 12 illustrates a comparison of the present invention with alternative models for processing the signal chips, including existing systems, all in a pulse jamming environment.

Upon adding 8-phase quantization to the preceding analysis the performance of the proposed version of the A/D converter may then be compared to that of the existing system and this comparison is depicted in FIG. 12. Here it was observed that for existing systems (curve No. 5) the maximal damage that a jammer can force upon the JTIDS system is 4.47 dB and this occurs for full time jamming, i.e., K=32. The hard limiter (curve No. 4) is only about 0.25 dB superior in performance.

For the proposed system of the present invention (curve No. 1) results were obtained by a 10000 trial simulation. Here the worst jammer damage is inflicted when K=13, as in the continuous phase case. However, the conversion loss is 1.7 dB so that there is a net gain of 2.77 dB in system performance by introducing the A/D bi-level quantizer.

It is anticipated that a mean magnitude criterion could be used in place of the former approach. However, the number of unjammed chips on either side of the mean threshold level may fluctuate by a large margin which adds complexity to the mean chip magnitude implementation.

In some scenarios the noise may be a combination of CW jamming and Gaussian noise, whose intensities may vary from chip to chip and from symbol to symbol. Consequently the present invention assumes only that the combined noise is statistically independent from chip to chip and that it is radially symmetric i.e., the phase (of the complex noise vector) is uniformly distributed over $[0, 2\pi]$, where $\pi=3.1415927$ and is independent from symbol to symbol.

The major conclusions resulting from the analysis of the present invention were:

(1) The proposed JTIDS A/D bi-level processor enjoys the CFAR property. Computer programs currently available based on 2D FFT's could be used to determine the threshold settings for desired false alarm rates.

(2) The weighting factor of R=8 with 70 percent threshold slice criterion yields nearly optimum conversion gain in continuous CW jamming and maintains the current performance against pure Gaussian noise.

(3) The maximal conversion loss inflicted by a pulse jammer in the proposed system is 1.7 dB, which occurs when 13 of the 32 chips of JTIDS pulse are jammed. This is still a 2.77 dB improvement over the worst conversion loss in the present system which occurs when all 32 chips are jammed.

The preceding discussion described the advantageous results achieved by implementing a threshold level that optimizes conversion gain in conjunction with application of a selected weighting factor. The following discussion provides mathematical analysis that may be used to establish the optimum threshold level. It is to be understood that the optimum threshold level may also be determined experimentally, as previously described.

Single Chip Signal-Pure CW Jamming With Continuous Phase Quantization

Referring to FIG. 2, consider a single signal of A volts which is jammed by a CW jammer whose strength is B volts, where $A = |\vec{A}|$, $B = |\vec{B}|$ and $\vec{B}=Be^{j\theta}B$ is the complex CW pulse (with $\theta_B$ uniform on $[0, 2\pi]$). The receiver is capable of obtaining only the phase, $\phi$, of the resultant vector $\vec{C}=\vec{A}+\vec{B}$ relative to $\vec{A}$ so that the receiver can store the I and Q channel chip values given by:

$$I = \cos\phi = \frac{A + B\cos\theta_B}{D}$$

$$Q = \sin\phi = \frac{B\sin\theta_B}{D}$$

where $$D = \sqrt{A^2 + B^2 + 2B\cos\theta_B}$$

Now suppose that one weights the I and Q values by the amount R, depending upon whether $|\vec{C}|\geq V_T$ where $V_T$ is a magnitude voltage threshold, determined so that probability $(|\vec{C}|\geq V_T) = p$, (p being prescribed in advance to optimize conversion gain).

The relationship between p and $V_T$ is easy to find, since $\theta_B$ is uniformly distributed on $[0, 2\pi]$. In fact, since:

$$D^2 = A^2 + B^2 + 2B\cos\theta_B \geq \qquad \text{Eq 1}$$

$$V_T^2 \Longleftrightarrow \frac{V_T^2 - (A^2 + B^2)}{2B} \leq$$

$$\cos\theta_B \Longleftrightarrow |\theta_B| \leq \left|\cos^{-1}\left(\frac{V_T^2 - (A^2 + B^2)}{2B}\right)\right|$$

where the positive $\cos^{-1}$ is to be chosen, One obtains:

$$P = \frac{2\cos^{-1}\left(\frac{V_T^2 - (A^2 + B^2)}{2B}\right)}{2\pi} \quad \text{Eq 2}$$

Clearly, by circular symmetry, $E(Q)=0$. However, since the signal is concentrated on the X-axis, $E(I)>0$ and, in fact:

Fixing p and therefore $V_T$ by:

$$V_T^2 = 2B\cos(p\pi) + A^2 + B^2$$

It follows that, $$E(I) = \frac{1}{\pi}\left[\int_0^{P\pi} \frac{A + B\cos\theta}{\sqrt{A^2 + B^2 + 2B\cos\theta}} d\theta + R\int_{P\pi}^{\pi} \frac{A + B\cos\theta}{\sqrt{A^2 + B^2 + 2B\cos\theta}} d\theta\right] \quad \text{Eq 3}$$

[NOTE:
By circular symmetry one need let $\theta$ range only over $[0,\pi]$)].

$$J_3 = \text{Var}(\vec{C}) = E(I^2 + Q^2) - E^2(I) - E^2(Q) \quad \text{Eq 4}$$

However, $I^2 + Q^2 = 1$ with probability $p$
$\phantom{\text{However, }I^2 + Q^2} = R^2$ with probability $1 - p$ \quad Eq 5

This last relation holds as well for Gaussian noise as well as for arbitrary mixtures of CW jamming and Gaussian noise.
From the above $$\left(\frac{J}{S}\right)_3$$

may be written as:

$$\left(\frac{J}{S}\right)_3 = \frac{1 - p + pR^2 - E^2(I)}{E^2(I)} = \frac{1 - p + pR^2}{E^2(I)} - 1 \quad \text{Eq 6a}$$

where $E(I)$ is given by Eq 3 in the case of pure CW jamming.
Then conversion gain may be calculated in dB via, $$CG = 10\log_{10}\frac{(J/S)_2}{(J/S)_3} = 10\left[\log_{10}B^2 - \log_{10}\left(\frac{1 - p + pR^2}{E^2(I)} - 1\right)\right] \quad \text{Eq 6b}$$

In order to determine, for fixed R, the value of p which optimizes (i.e., maximizes) CG it suffices to minimize $(J/S)_3$ or equivalently, to maximize the value $\alpha(p)$, where $$\alpha(p) = \frac{E^2(I)}{1 - p + pR^2} \quad \text{Eq 7a}$$

Differentiating $\alpha(p)$ with respect to p yields:

$$\alpha'(p) = \frac{(1 - p + pR^2)2E(I)\frac{dE(I)}{dp} - E^2(I)(R^2 - 1)}{(1 - p + pR^2)^2} \quad \text{Eq 7b}$$

Setting $\alpha'(p)=0$ one finds that p must satisfy the integral equation:

$$2(1 - p + pR^2) \cdot \frac{A + B\cos(p\pi)}{\sqrt{A^2 + B^2 + 2B\cos(p\pi)}} = \quad \text{Eq 7c}$$

$$\left(\frac{R^2 - 1}{\pi}\right)\left[\int_0^{p\pi} f(\theta)d\theta + R\int_{p\pi}^{\pi} f(\theta)d\theta\right]$$

where, $$f(\theta) = \frac{A + B\cos\theta}{\sqrt{A^2 + B^2 + 2B\cos\theta}} \quad \text{Eq 7d}$$

Although Eq7c would yield an exact solution for the determination of the optimal value for p, the more pragmatic approach, via a computer search from Eq6b, may be utilized, since there is no elementary solution to Eq7c.

Single Chip Signal-Pure Gaussian Noise With Continuous Phase Quantization

Figure 13A:
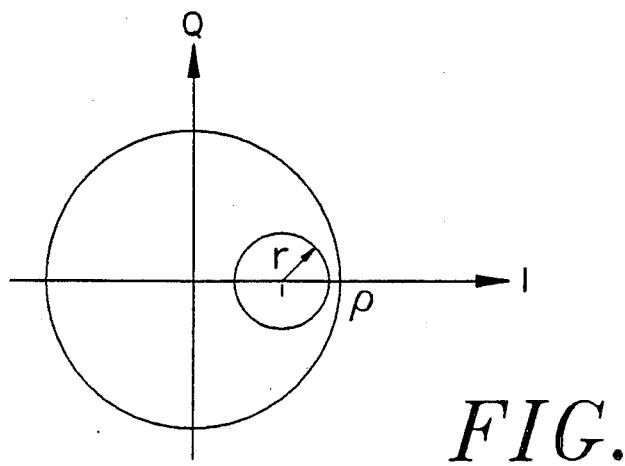
FIG. 13a, 13b and 13c illustrate mathematical analyses relating to determining the optimum threshold level in Gaussian noise.
Figure 13B:
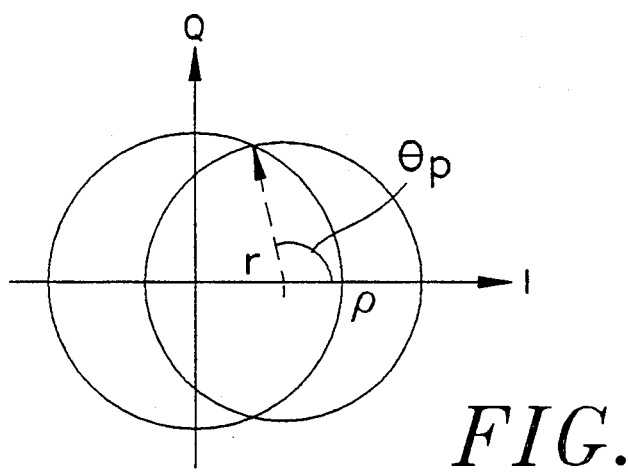
Figure 13C:
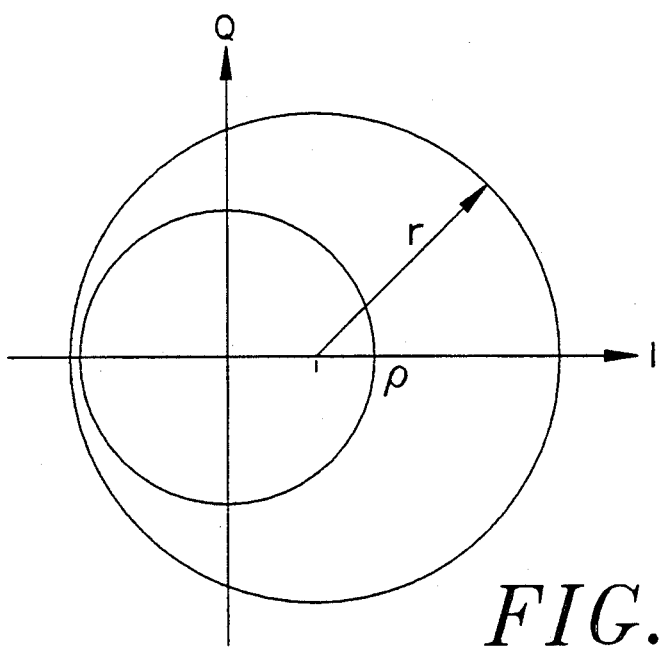

In this case the magnitude of the complex Gaussian noise vector, $\vec{B}$, is no longer a constant (it is a Rayleigh distributed random variable since it represents the envelope of two independent zero mean Gaussian processes with equal variance) and Expectation $(|\vec{B}|^2) = 2\sigma^2$ where $\sigma^2$ = common variance or noise power spectral density of the I and Q channel outputs under the assumption of continuous phase quantization. Here, we set $A=1$ without any loss of generally, and we let $\rho = V_T$ for notational convenience. From FIG. 13, one observes that when $\rho>1$, there are three distinct magnitude conditions for r (the noise magnitude) which are mutually exhaustive yielding the result:

$$E(I) = \frac{1}{\pi}\left[\int_0^{\rho - 1}\int_0^{\pi} g(r)f(r,\theta)d\theta dr + R\int_{\rho - 1}^{\rho + 1}\int_0^{\theta_p} g(r)f(r,\theta)d\theta dr + \int_{\rho - 1}^{\rho + 1}\int_{\theta_p}^{\pi} g(r)f(r,\theta)d\theta dr + R\int_{\rho + 1}^{\infty}\int_0^{\pi} g(r)f(r,\theta)d\theta dr\right] \quad \text{(Eq 8)}$$

where, $$g(r) = \frac{r}{\sigma^2} e^{-(r^2/2\sigma^2)} \quad \text{Eq 8a}$$

$$f(r,\theta) = \frac{1 + r\cos\theta}{\sqrt{1 + r^2 + 2r\cos\theta}} \quad \text{Eq 8b}$$

and $$\theta_p = \cos^{-1}\left(\frac{\rho^2 - 1 - r^2}{2r}\right) \quad \text{Eq 8c}$$

which is found by considering where the threshold circle of radius $\rho$ intersects the circle of radius r (the noise magnitude) about the signal vector A = (1,0). By the law of cosines this occurs when, $$\rho^2 = 1 + r^2 + 2r\cos\theta_p \quad \text{Eq 8d}$$

which is equivalent to Eq8c.

Eq8 may be rewritten in terms of three integrals by noting that, $$\int_{\theta_p}^{\pi} f(r,\theta)d\theta = \int_{0}^{\pi} f(r,\theta)d\theta - \int_{0}^{\theta_p} f(r,\theta)d\theta \quad \text{Eq 9}$$

This yields, $$E(I) = \frac{1}{\pi} \int_{0}^{\rho+1}\int_{0}^{\pi} g(r)f(r,\theta)d\theta dr + (R-1) \cdot$$

$$\int_{\rho-1}^{\rho+1}\int_{0}^{\theta_p} g(r)f(r,\theta)d\theta dr + R \cdot$$

$$\int_{\rho+1}^{\infty}\int_{0}^{\pi} g(r)f(r,\theta)d\theta dr \quad \text{Eq 10}$$

The probability $p = P_R$ that a chip will be given a higher weight R is determined by:

$$P_R = \frac{1}{\pi}\int_{\rho-1}^{\rho+1} g(r)\cos^{-1}\left(\frac{\rho^2 - 1 - r^2}{2r}\right)dr + e^{-\frac{1}{2}\left(\frac{\rho+1}{\sigma}\right)^2} \quad \text{Eq 11}$$

The second case to consider is that of $\rho > 1$. Then, similar expressions for E(I) and $P_R$ are found from:

$$E(I) = \frac{1}{\pi}\left[ R \cdot \int_{0}^{1-\rho}\int_{0}^{\pi} g(r)f(r,\theta)d\theta dr + R \cdot \right.$$

$$\int_{1-\rho}^{1+\rho}\int_{0}^{\theta_p} g(r)f(r,\theta)d\theta dr +$$

$$\int_{1-\rho}^{1+\rho}\int_{\theta_p}^{\pi} g(r)f(r,\theta)d\theta dr + R \cdot$$

$$\left. \int_{1+\rho}^{\infty}\int_{0}^{\pi} g(r)f(r,\theta)d\theta dr \right] \quad \text{Eq 12a}$$

By using Eq9 above, this may be simplified to:

$$E(I) = \frac{1}{\pi}\left[ R \cdot \int_{0}^{\infty}\int_{0}^{\pi} g(r)f(r,\theta)d\theta dr - (R-1) \cdot \right.$$

$$\left. \int_{1-\rho}^{1+\rho}\int_{\theta_p}^{\pi} g(r)f(r,\theta)d\theta dr \right] \quad \text{Eq 12-b}$$

An expression for $P_R$ which subsumes both cases of $\rho > 1$ and $\rho \leq 1$ may be written as follows:

$$P_R = \frac{1}{\pi}\int_{|\rho-1|}^{\rho+1} g(r)\cos^{-1}\left(\frac{\rho^2 - 1 - r^2}{2r}\right)dr + $$

$$e^{-\frac{1}{2}\left(\frac{\rho+1}{\sigma}\right)^2} + \delta \cdot \left(1 - e^{-\frac{1}{2}\left(\frac{\rho-1}{\sigma}\right)^2}\right) \quad \text{Eq 13}$$

where, $\delta = 1$ if $\rho \leq 1$ $\delta = 0$ if $\rho > 1$.

Multiple Chip Pulse-Pure CW Jamming With Continuous Phase Quantizer

Now assume one has an L chip pulse or signal, (L=32 for JTIDS), and let each chip have voltage A and assume again that a CW jammer is present which is on for some fraction, $\tau$, of the pulse time with magnitude $B_J$, where the phases per chip $\phi_1, \phi_2, \phi_3 \ldots \phi_L$ are statistically independent of each other and each is uniformly distributed over the interval [0,2], as before.

The receiver now has the capability to order the chip stream magnitudes $D_1, D_2, \ldots, D_L$ where $D_i = |C_i|$, $C_i$ being the complex representation of the ith jammer pulse (which is present over the ith signal chip duration). Thus the receiver orders the magnitude in the sequence, which, without loss of generality one may assume to be given by:

$$D_1 \leq D_2 \leq D_3 \leq \ldots \leq D_L$$

and then weights the top 100p percent magnitudes by R and the bottom 100(1-p) percent magnitudes by 1. For example, let p=.7. Since, for JTIDS L=32, pL=.7(32)=22.4, then the highest magnitude chips of which there are 23, (approximately) will be given weight R=8 (e.g.) and the first 9 chips will be given weight 1.

An approximate model for A/D CG determination is described below. The model assumes that selecting the top 100p chip magnitudes and weighting them by R is roughly equivalent, in the case of the full time jammer, to assuming that each chip was randomly and independently chosen from a population subject to a CW jammer of magnitude $B_J$. This means that each of the jammed chips has probability p of being selected for maximal weighting R. Simulation results were developed to verify the analysis and were determined to be in excellent agreement with this assumption for $$\left(\frac{J}{S}\right)_2 \geq 5 \text{ dB}.$$

Furthermore, for the JTIDS case of intersect, $$\left(\frac{J}{S}\right)_2 = 2.1 \text{ dB}$$

there was good agreement between simulation (based on 10000 independent trials or replications of the process) and analysis when $K \leq 12$, and when $K=32$, (full time jamming). For $K \geq 13$ pulses jammed, the simulation showed that the approximate model is conservative and tends to underestimate the A/D CG performance by about 1 dB.

Figure 14:
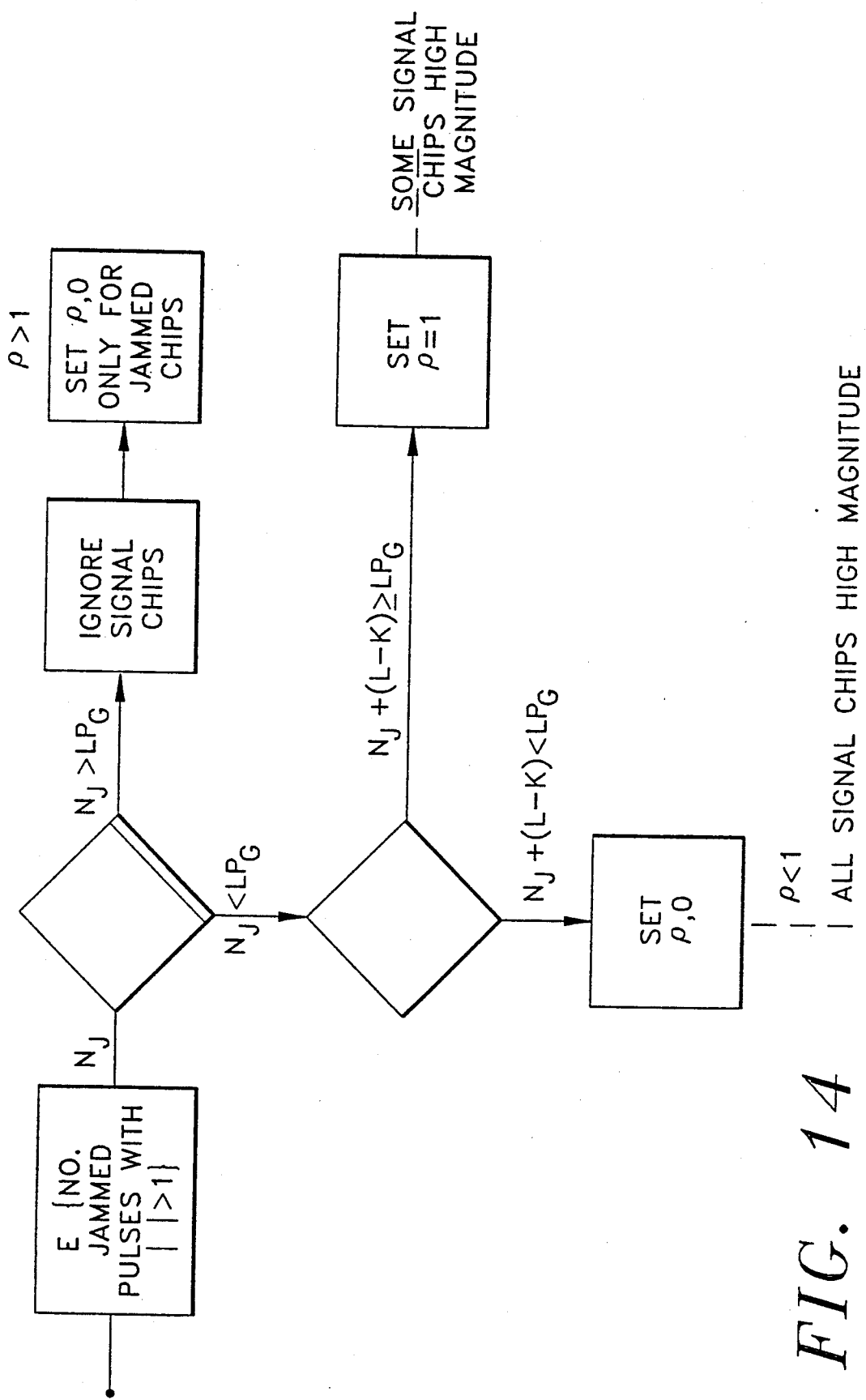
FIG. 14 is a flow chart illustrating an approximate mathematical analysis of the present invention.

The analysis will be facilitated by examining FIG. 14, which depicts the flow chart for the A/D CG model when the L chip pulse is subject to CW pulse jamming. Let $P_G$ = Prob (Chip is given weight R) and denote by K the number of jammed pulses, while $N_J$ = Expected (# of jammed chips whose magnitude is greater than or equal to 1), i.e., if $\vec{C}$ is a signal chip then $$N_J = E(\# \text{jammed chips such that } |\vec{C}| \geq 1).$$

From FIG. 14, one observes that there are three basic situations to consider, viz. Cases (a), (b) and (c). Since the pulse jammer trades reduced duty cycle for peak power note first that:

$$KB_J^2 = LB^2 \text{ or } B_J = \sqrt{L/K} \cdot B$$

Case (a): $N \geq LP_G$ $N_J = KP_J$ where:

$$P_J = \text{Prob}(|\text{Jammed Chip}| \geq 1) = \frac{1}{\pi} \cos^{-1}\left(\frac{-B_J}{2}\right)$$

Here, one may ignore the L-K signal chips whose magnitudes are equal to 1, since there are enough jammed chips among the K which are present to meet the $LP_G$ required to be given weight R. Now $\rho > 1$, and one may assume, in the approximate model formulation, that $\rho$ is effectively set by the receiver, using Eq2 above. i.e., $$\rho^2 = V_T^2 = 2B_J\cos(P_G\pi) \text{ or } \qquad \text{Eq 14a}$$

$$\rho = \sqrt{1 + B_J^2 + 2B_J\cos(P_G\pi)}$$

while $\theta_{BJ}$ is given by:

$$\theta_{BJ} P_B \pi \qquad \text{Eq 14b}$$

Let $$X = \sum_{i=1}^{L} I_i \qquad \text{Eq 15a}$$

$$Y = \sum_{i=1}^{L} Q_i \qquad \text{Eq 15b}$$

where $(I_i, Q_i)$ are the in-phase and quadrature phase components of $\vec{C}_i$ the received ith signal chip of the given pulse.

The correlator output voltage after L chips will be denoted by V, where $$V = X + \sqrt{-1} \, Y$$

and $$C = \frac{E(V)}{L} = \frac{1}{L}\left[\sum_{i=1}^{L} E(I_i) + \sqrt{-1} \sum_{i=1}^{L} E(Q_i)\right] \qquad \text{Eq 16}$$

But since $E(Q_i) = 0$, $1 \leq i \leq L$ one has:

$$C = \frac{1}{L} \sum_{i=1}^{L} E(I_i) = \frac{(L-K) + K \cdot E(I)}{L} \qquad \text{Eq 17}$$

where E(I) is given by Eq3 with A=1 (and $B_J$ replacing B in that equation).

Thus, $$E(I) = \frac{1}{\pi}\left[\int_0^{P_G\pi} \frac{1 + B_J\cos\theta}{\sqrt{1 + B_J^2 + 2B_J\cos\theta}} d\theta + \right. \qquad \text{Eq 18a}$$

$$\left. R \cdot \int_{P_G\pi}^{\pi} \frac{1 + B_J\cos\theta}{\sqrt{1 + B_J^2 + 2B_J\cos\theta}} d\theta \right]$$

$$J_3 = \frac{\text{Var}(V)}{L} = \frac{K \cdot \text{Var}(\text{Jammed Chip})}{L} \qquad \text{Eq 18b}$$

$$= \frac{K[(1-P_J) + P_J R^2 - E^2(I)]}{L}$$

$$CG = 10\left(\log_{10} B^2 - \log_{10}\left(\frac{J_3}{\bar{C}^2}\right)\right) \qquad \text{Eq 18c}$$

Case (b): $N_J < LP_G \leq N_J + (L-K)$

In this event there are not enough jammed chips available to make up the needed set of $LP_G$ (on average) to which one wishes to ascribe the weight R and it is then necessary to dip into the pool of signal chips to achieve the desired goal.

Here $$P = 1 \text{ and } P_J = \frac{1}{\pi} \cos^{-1}(-B_J/2)$$

and if $Q_G = 1 - P_G$, $Q_J = 1 - P_J$ then $$C = E(V) = \frac{1}{L}(R(LP_G - KP_J) + LQ_G - KQ_J + KE(I)) \qquad \text{Eq 19a}$$

while $J_3$ is found as in Eq18b

Case (c): $LP_G > N_J + L - K$

When this condition holds, all of the signal chips will be given the high magnitude weight R. Here P is obtained from Eq14a, as before, while $\bar{C}$ is given by:

$$C = \frac{R(L-K) + KE(I)}{L} \qquad \text{Eq 19b}$$

and E(I) is determined as in Eq18a.

As is mathematically demonstrated in the remaining discussion below, the A/D bilevel quantizer of the present invention has the property that it maintains a constant false alarm rate (CFAR property) when no signal is present. The analysis assumes that the noise is independent from chip to chip in a given signal pulse. The noise may vary, in fact, from chip to chip and from symbol to symbol, as in the case of a partial time pulse jammer. For example the noise may be pure CW for one chip, pure Gaussian for another chip, and a mixture of CW and Gaussian for a third chip, etc. In each of the three cases mentioned, the complex noise process in two dimensions has the property of radial symmetry given by Eq20 below. If $p_i(r,\theta)$ is the joint density of $r$ and $\theta$ in the ith noise chip then, it will be assumed that:

$$P_i(r,\theta) = f_i(r) \cdot g_i(\theta) \qquad \text{Eq20}$$

where $$g_i(\theta) = \frac{1}{2\pi}$$

Thus, the phase and envelope of each chip are stochastically independent of each other for chip i, where, $1 \leq i \leq L$, and also stochastically independent from chip to chip (and from symbol to symbol). Furthermore, the distribution of is uniform over $[0, 2\pi]$ but the radius random variable $r$ may be distributed arbitrarily. Specifically, one excludes noise processes in receiver circuits in which interchip interference may occur, as in MSK, unless one can verify that the resultant random variables, $\{r_i, \theta_i\}$ possess radial symmetry as discussed above, in which case the ensuing argument would still hold.

If now $\{\text{chip}_i\}$ $i = 1, 2, \ldots L$ constitute a set of L noisy chips whose polar coordinates $(r_i, \theta_i)$ in complex notation are given by:

$$I_i = r_i e^{j\theta_i}, \text{ for } 1 \leq i \leq L, \text{ with } j = \sqrt{-1},$$

Then the joint density of 2L random variables $r_i$, $\theta_i$ for $1 \leq i \leq L$, prior to the rank ordering of the chip magnitudes is denoted by $9(\theta_1, \theta_2, \ldots \theta_L; r_1, r_2, \ldots r_L)$ where, by the above assumptions of stochastic independence and radial symmetry:

$$q(\theta_1, \theta_2, \ldots \theta_L; r_1, r_2, \ldots r_L) = \left(\frac{1}{2\pi}\right)^L f_1(r_1) f_2(r_2) \ldots f_L(r_L) \qquad \text{Eq 21}$$

After rank ordering of the chip magnitudes, there is no preferred direction for the phases of the resultant ranked quantities, i.e., the process is isotropic. This means that if $r_{(1)}, r_{(2)}, \ldots r_{(L)}$ are the ranks in ascending order, so that:

$$r_{(1)} \leq r_{(2)} \leq \ldots \leq r_{(L)}$$

then these $r_{(i)}$, have random and statistically independent phases distributed over $[0, 2\pi]$.

It is anticipated that the above property of isotropicity would be lost if a signal were present in which the phases of the high magnitude chips are strongly correlated to the values of those magnitudes, in point of fact.

Assuming the 8 basic states of a conventional IAGC are denoted as:

$$L_1: (2\delta_1, \delta_2), (\delta_3, 2\delta_4)$$

where $\delta_i = \pm 1$, $1 \leq i \leq 4$

Let the additional 8 states created by the bi-level quantizer be given by:

$$L_2: (2R\delta_5, R\delta_6), (R\delta_7, 2R\delta_8)$$

where $\delta_i = \pm 1$, $5 \leq i \leq 8$ where it is assumed that R is a positive integer. The implications from the above observations are then as follows:

(1) The top $N = [P_G L] + 1$ magnitude chips are independently and identically distributed on the lattice $L_2$.

(2) The bottom $L-N$ magnitude chips are independently and identically distributed on the lattice $L_1$. Thus, if $\{I_i, Q_i\}$ are in-phase and quadrature components of Chip(i), $1 \leq i \leq L$ then one forms the two quantities $\tilde{I}, \tilde{Q}$ where:

$$\tilde{I} = \sum_{i=1}^{L} I_i$$

$$\tilde{Q} = \sum_{i=1}^{L} Q_i$$

The random vector or complex quantity $(\tilde{I}, \tilde{Q})$ may be thought of as being generated by a random walk in the plane n the lattice of integers $(\pm n, \pm m)$ for $o \leq n, m < \infty$ in which the first N steps of the walk are chosen from $L_2$ and the remaining L-N steps are chosen from $L_1$ with:

$$P((I_i, Q_i) = (a,b)) = \frac{1}{8} \quad (a,b) \epsilon L_2 \qquad \text{Eq 22a}$$
$$\text{for } 1 \leq i \leq N$$

$$P((I_i, Q_i) = (c,d)) = \frac{1}{8} \quad (a,b) \epsilon L_1 \qquad \text{Eq 22b}$$
$$\text{for } N + 1 \leq i \leq L$$

Clearly the distribution of $(\tilde{I}, \tilde{Q})$ is independent of the statistics of the random variables $(r_i, \theta_i)$ for $1 \leq i \leq L$ It should be noted that this resultant random walk is based on the rank ordered chip magnitudes. It is not the equivalent of a random walk on the plane integer lattice in which each of L independent chips may be chosen from the 16 combined states of $L_1 \cup L_2$ with each state having probability of occurrence $= 1/16$. Suppose now that M symbols or pulses of the JTIDS preamble are processed with the revised A/D converter correlator and let $(\tilde{I}_m, \tilde{Q}_m)$ be the mth quadrature correlator outputs corresponding to Eqs. 21a, b. After correlation, $\tilde{I}_m$ and $\tilde{Q}_m$ are processed for each symbol in a combiner circuit which reconstructs the envelope of the correlated signal. Since the desired envelope given by:

$$Z_m = \sqrt{\tilde{I}_m^2 + \tilde{Q}_m^2} \qquad \text{Eq 23a}$$

is difficult to obtain in digital hardware, one uses:

$$\begin{aligned} \overline{Z}_m &= |\tilde{I}_m| + .5|\tilde{Q}_m| \quad \text{if } |\tilde{I}_m| \geq |\tilde{Q}_m| \\ &= |\tilde{Q}_m| + .5|\tilde{I}_m| \quad \text{otherwise} \end{aligned} \qquad \text{Eq 23b}$$

The SNR loss in using this approximation has been estimated to be 0.25 dB. The determination of the false alarm a threshold is based on the sum of these M video outputs.

Let $$U_M = \sum_{m=1}^{M} \bar{Z}_m$$

where $U_M$ is a sum of M independent random variable $\bar{Z}_m$, each of which is identically distributed.

Since the $\bar{Z}_m$ depend on the complex random vector $(\bar{I}_m, \bar{Q}_m)$ which is the resultant of the random walk, it follows that the AGC (Automatic Gain Control) properly has been achieved, and CFAR holds. Thus, in the absence of signal to the correlator of the A/D bi-level quantizer circuitry, the input noise process can vary from chip to chip or from symbol to symbol. The effect of the conventional IAGC and of the bi-level quantizer, after magnitude rank ordering has been achieved, is to standardize the chip outputs to a random walk involving the 16 states $L_1$ and $L_2$ so that the statistics $\bar{I}_m$, $\bar{Q}_m$, $\bar{Z}_m$, and finally $U_M$ are independent of that initial noise process. An exact analysis to set the false alarm threshold $T_M$ such that:

$$\text{Prob } (U_M \geq T_M) = \text{Prob (False Alarm)}$$

may be readily achieved by first convoluting the two dimension random walk on $L_1$ a total of L-N times via a 2D FFT to obtain the 2D random vector $(\bar{A}_1, \bar{B}_1)$. A second N fold convolution of the 2D random walk on $L_2$ will yield the second random vector $(\bar{A}_2, \bar{B}_2)$. A final convolution of $(\bar{A}_1, \bar{B}_1)$ with $(\bar{A}_2, \bar{B}_2)$ will yield $(\bar{I}_m, \bar{Q}_m)$. Then the statistics for $Z_M$, which is an integer random variable on the lattice $\{n\Delta\}$, $n=0,\pm 1,\pm 2,\ldots$ with $\Delta = 0.5$, can be found by sorting the outputs of $(\bar{I}_m, \bar{Q}_m)$. Finally, by convolving $\bar{Z}_m$ a total of M times using a 1D FFT, the distribution of $U_M$ is readily determined.

As will be apparent to one of ordinary skill in the art, the above signal analysis and mathematical modeling are intended to disclose aspects of the presently preferred embodiment of the invention. However, various other embodiments are intended to be encompassed within the spirit and scope of the invention. For example, it is anticipated that the optimum threshold criterion may vary where the IF input signal was characterized by a different signal-to-noise ratio. $(J/S)_1$ Accordingly, it is to be understood that the present invention is not to be limited to a particular threshold criterion or weighting gain factor.

What is claimed is:

1. A method of improving antijam performance of a processing circuit via conversion gain in the reception of a received phase modulated signal accompanied by jamming interference, the method comprising:
   receiving a plurality of input signal segments each of said segments including a phase modulated information signal portion and an interference portion;
   separating said input signal segments into a predetermined number of signal chips;
   sorting the signal chips, in accordance with signal chip amplitude;
   setting a first amplitude threshold to segregate the signal chips based on the relative amplitude of the signal chips;
   repeating said steps of separating, sorting and setting a first amplitude threshold for each input signal segment to repeatedly identify a predetermined number of said signal chips having greater relative amplitude; and
   applying a first weighting gain factor to signal chips that exceed said first amplitude threshold and a second weighting gain factor to remaining signal chips, said first weighting gain factor being greater than said second weighting gain factor.

2. The method as recited in claim 1 wherein said step of sorting signal chips comprises flash converting said signal chips to signal chip amplitude levels and determining an amplitude level that distinguishes said predetermined number of received signal chips having greater amplitude.

3. The method as recited in claim 1 wherein said received signal segments are segregated into 32 signal chips.

4. The method as recited in claim 2 wherein said step of setting a first threshold comprises translating each of said signal chips into polar coordinates.

5. The method as recited in claim 1 wherein said step of setting a first amplitude threshold comprises:
   assuming a first characteristic signal-to-noise ratio $(J/S)_1$ for received signal segments;
   selecting a preliminary amplitude threshold for evaluation;
   selecting a preliminary weighting gain factor for evaluation;
   varying each of both the preliminary amplitude threshold and the preliminary weighting gain factor to experimentally determine resulting conversion gain in the presence of CW interference under different amplitude threshold and gain factor conditions;
   identifying the weighting gain factor and amplitude threshold corresponding to the highest conversion gain of the processing circuit in the presence of CW interference, the identified gain factor and amplitude threshold corresponding to a preliminary optimum gain factor and preliminary optimum amplitude threshold, respectively, with respect to CW interference;
   determining the conversion gain of the processing circuit in the presence of Gaussian interference, with said amplitude threshold and said weighting gain factor at said identified preliminary optimum gain factor and preliminary optimum amplitude threshold respectively;
   determining the conversion gain of a hard limiter in the presence of Gaussian interference, assuming the first signal-to-noise ratio for the received signal;
   comparing the conversion gain of the hard limiter in the presence of Gaussian interference to the conversion gain of the processing circuit in the presence of Gaussian interference; and
   adjusting said preliminary optimum amplitude threshold to an adjusted optimum amplitude threshold such that the conversion gain of the processing circuit in the presence of Gaussian interference at least equals the conversion gain of the hard limiter in the presence of Gaussian interference.

6. The method as cited in claim 5 wherein said step of adjusting the preliminary optimum amplitude threshold is performed as said preliminary optimum gain factor is maintained constant.

7. The method as cited in claim 6 wherein said preliminary optimum gain factor is 8.

8. The method as cited in claim 6 wherein said preliminary optimum amplitude threshold is the amplitude exceeded by approximately 60% of the chips and said adjusted optimum amplitude threshold is the amplitude exceeded by approximately 70% of the chips.

9. The method as recited in claim 5 wherein said received signal consists of a phase modulated information signal portion and a constant power CW interference portion.

10. The method as recited in claim 5 wherein said received signal consists of a phase modulated information signal portion and a pulsed CW interference portion.

11. An input processing circuit for increasing conversion gain and reducing small signal suppression of a phase modulated input signal accompanied by jamming interference comprising:

an input port for sequentially receiving a plurality of input signal segments, each of said segments including a phase modulated information signal portion and an interference portion;

a chip matched filter connected to the input port for converting each of the input signal segments to a plurality of signal chips;

an adaptive threshold circuit, connected to the chip matched filter for sorting the signal chips in accordance with signal amplitude and identifying a predetermined number of said signal chips having greater relative amplitude, said adaptive threshold further being operative to assign a first weighting gain factor to said signal chips having greater relative amplitude and a second weighting gain factor to remaining signal chips, said first weighting gain factor being greater than said second weighting gain factor;

a phase quantizer in electrical communcation with said adaptive threshold circuit for extracting phase information from said signal chips; and a pulse correlator connected to said phase quantizer for weighting the phase information extracted from said chips in accordance with the weighting gain factor assigned to the respective chip; and wherein a constant number of signal ships of each input signal segment are assigned said first weighting gain factor.

12. The circuit as recited in claim 11 wherein said adaptive threshold circuit comprises a flash convertor operative to determine an amplitude level that distinguishes said signal chips having greater relative amplitude.

13. The circuit as recited in claim 11 wherein said chip matched filter is operative to segregate each of said input signal segments into signal chips.

14. The circuit as recited in claim 11 wherein said adaptive threshold circuit is operative to translate said signal chips into polar coordinates.

15. The circuit as recited in claim 11 wherein said predetermined number of signal chips is selected to optimize conversion gain of the processing circuit.

16. The circuit as recited in claim 15 wherein said predetermined number of signal chips is selected to optimize conversion gain of the processing circuit when said input signal interference portion comprises continuous CW interference.

17. The circuit as recited in claim 15 wherein said predetermined number of signal chips is selected to optimize conversion gain of the processing circuit when said input signal interference portion comprises pulsed CW interference.

18. The circuit as recited in claim 15 wherein said predetermined number of signal chips is set to provide conversion gain of the processing circuit that is greater than that provided by a hard limiter when said input signal interference portion comprises Gaussian interference.

19. The circuit as recited in claim 11 wherein said first weighting gain factor is selected to optimize conversion gain of the processing circuit.

20. The circuit as recited in claim 13 wherein said predetermined number of signal chips is 23 and said weighting gain factor is 8.

* * * * *